Patented Mar. 12, 1940

2,193,327

UNITED STATES PATENT OFFICE 2,193,327

ARTIFICIAL RESINS

Fritz Blass, Bad Soden, Taunus, and Paul Heisel and Albert Hendschel, Gersthofen, near Augsburg, and Otto Nicodemus, Frankfort-on-the-Main-Hochst, Germany, assignors to I. G. Farbenindustrie Aktiengesellschaft, Frankfort-on-the-Main, Germany No Drawing. Application April 6, 1938, Serial No. 200,424. In Germany April 13, 1937

23 Claims. (Cl. 260—47)

The present invention relates to artificial resins.

We have found that new products of resinous character may be obtained by hydrogenating saturated aliphatic hydrocarbons substituted by at least three substituents of the formula —R—OH, wherein R stands for an aromatic hydrocarbon radical. The resins thus obtained are soluble in alcohols and ketones, but they are insoluble in benzene, ether, alkalies and acids as well as in benzine; they may be boiled in linseed oil. The resins are light colored, non-pliable products which still contain alcoholic groups capable of being etherified and esterified.

The parent materials may be hydrogenated in fused condition or in the presence of solvents. As solvents there may, for instance, be used: methanol, ethanol, propanol, iso-propanol or n-butanol. The higher alcohols are more suitable than the lower alcohols. As hydrogenation catalyst there may be used, for instance, finely subdivided nickel which may be carried on carrier substances, for instance on pumice-stone, silicagel or magnesium carbonate.

The hydrogenation may be conducted at a temperature between about 150° C., and about 300° C. and under a pressure of about 100 and about 300 atmospheres.

Good results are obtained if the hydrogenation is interrupted while the quantity of hydrogen absorbed is smaller than that which would theoretically be necessary for complete hydrogenation of all the aromatic double bonds. For instance only half to about nine tenths of the theoretical quantity of hydrogen, suitably about two thirds of this quantity, may be caused to react. The products capable of being boiled in linseed oil can be better diluted with benzine, the greater the quantity of hydrogen absorbed during the hydrogenation.

The hydrogenation may be performed continuously in a long tube.

The starting materials may be prepared by the reaction of phenol, cresols, other homologues of phenol and naphthols with monochlorinated or polychlorinated saturated or unsaturated aliphatic aldehydes or ketones or with unsaturated aliphatic aldehydes or ketones or with aliphatic aldehydes or ketones having at least one hydroxyl group, for instance according to the process described in U. S. Patent No. 1,732,503.

For instance phenol and monochloracetone yield the triphenylolpropane of the formula

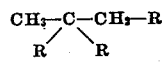

(R standing in this formula and in the following formulae for a benzene nucleus having an OH-group in para-position).

From phenol and symmetric dichloracetone there is produced

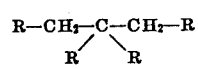

from phenol and asymmetric dichloracetone there is produced

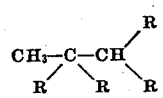

from phenol and trichloracetones there are produced

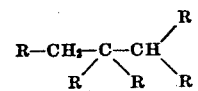

and

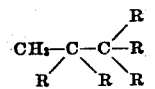

from phenol and pentachloracetone there is produced

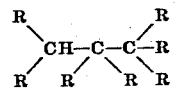

and from phenol and perchloracetone there is produced

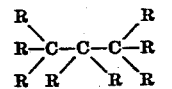

From phenol and alpha-chlormethyl-ethylketone there is produced

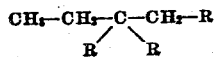

from phenol and chloracetaldehyde there is produced

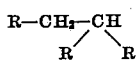

from phenol and vinyl-methyl-ketone there is produced with addition of the phenol to the double bond

from phenol and crotonaldehyde there is produced

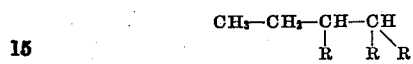

from phenol and chlorcrotonaldehyde there is produced

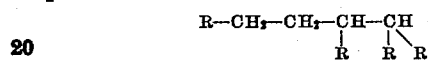

from phenol and 2-ethyl-3-propylacrolein there is produced

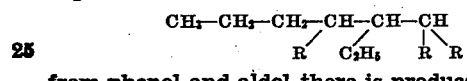

from phenol and aldol there is produced

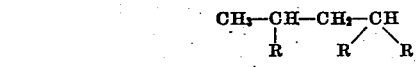

All these products may be used for the preparation of compounds of resinous character by hydrogenation. Instead of phenol the cresols may be used in the same manner.

The following examples serve to illustrate the invention, but they are not intended to limit it thereto, the parts being by weight:

(1) 1 part of triphenylolpropane is dissolved in 5 parts of ethanol; the solution is mixed with 0.1 part of nickel precipitated on pumice stone and treated with hydrogen at a temperature beginning at 150° C. and gradually rising to 250° C. under a pressure of 250 atmospheres. After the absorption of hydrogen is complete, the whole is filtered with suction to remove the catalyst and the solvent is recovered. The resin which remains has the properties named above.

(2) 1 part of tetraphenylolpropane is dissolved in 2.5 parts of isopropanol and the solution is hydrogenated in presence of a catalyst consisting of 0.05 part of nickel carried on pumice stone at a temperature between 160° C. and 200° C. under a pressure of 180 to 210 atmospheres. The resin obtained after the hydrogenation material has been worked up resembles in its properties the resin obtained according to Example 1.

(3) 1 part of tricresylolpropane is dissolved in 7.8 parts of isopropanol and the solution is hydrogenated under a pressure of 200 atmospheres in presence of a catalyst consisting of 0.05 part of nickel carried on pumice stone. A resin is obtained which has properties analogous to that of Example 1.

(4) 1 part of 1.1.3-phenylol-2-ethylhexane is dissolved in 3.2 parts of isopropanol and the solution is hydrogenated in presence of 0.1 part of nickel precipitated on pumice stone at a temperature of 170° C.–215° C. under a pressure of 180 to 200 atmospheres. By working up the solution there is obtained an amber-colored, non-pliable resin. This resin may be boiled with linseed oil-stand oil in a manner usual in the lacquer industry and thus yields a preparation which may readily be diluted with mineral spirit. Lacquer films made therefrom are clear and dry well.

(5) 1 part of a condensation product from crotonaldehyde and phenol are dissolved in sufficient alcohol to produce 4 parts by volume of solution and the solution is treated with 0.05 part of nickel on pumice stone as a catalyst under a pressure of hydrogen of 180 to 200 atmospheres and at a temperature of 160° C.–200° C. until 60 per cent. of the theoretical quantity of hydrogen necessary for the complete hydrogenation of the phenol nuclei has been absorbed. The catalyst is removed by filtering with suction, the bulk of the alcohol is distilled under reduced pressure and the residual alcohol is expelled by heating the resin up to 275° C. A clear, light colored resin is obtained in a good yield; its properties are similar to those of the resin of Example 1.

(6) 1 part of triphenylolbutane obtained from aldol and phenol are dissolved in 5 parts of alcohol; the solution is mixed with 0.05 part of nickel on pumice stone as a catalyst and the mixture is treated with hydrogen in an autoclave at a temperature of 200° C.–221° C. and under a pressure 130–195 atmospheres. The treatment is interrupted after 76 per cent. of the theoretical quantity of hydrogen have been absorbed and the product is then worked up as described in Example 5. A non-pliable, transparent resin is obtained. It has properties similar to those of the resin of Example 1.

(7) 1 part of triphenylolethane obtained from chloracetaldehyde and phenol are dissolved in 27 parts of alcohol; the solution is mixed with 1 per cent. of nickel carried on pumice stone as a catalyst and the mixture is treated with hydrogen at a temperature of 180° C.–200° C. and under a pressure of 200 atmospheres. A clear, non-pliable resin is obtained which has properties similar to those of the resin of Example 1.

(8) 1 part of triphenylolbutane obtained from vinylmethyl-ketone and phenol is treated with hydrogen as described in Example 7. A resin is obtained which has properties similar to those of the resin of Example 1.

We claim:

1. The products obtained by hydrogenating aliphatic saturated hydrocarbons substituted by at least three substituents of the formula —R—OH, wherein R stands for an aromatic hydrocarbon radical, said products being of resinous character, soluble in aliphatic alcohols and ketones, insoluble in benzene, benzine, ethers, acids and alkalies and capable of being boiled in linseed oil.

2. The products obtained by hydrogenating at temperatures between about 150° C. and about 300° C. aliphatic saturated hydrocarbons containing at least three substituents of the formula —R—OH, wherein R stands for an aromatic hydrocarbon radical, said products being of resinous character, soluble in aliphatic alcohols and ketones, insoluble in benzene, benzine, ethers, acids and alkalies and capable of being boiled in linseed oil.

3. The products obtained by hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical, said products being of resinous character, soluble in aliphatic alcohols and ketones, insoluble in benzene, benzine, ethers, acids and alkalies and capable of being boiled in linseed oil.

4. The products obtained by hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical of the benzene series, said products being of resinous character, soluble in aliphatic alcohols and ketones, insoluble in benzene, benzine, ethers, acids and alkalies and capable of being boiled in linseed oil.

5. The products obtained by hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical in the presence of an organic solvent, said products being of resinous character, soluble in aliphatic alcohols and ketones, insoluble in benzene, benzine, ethers, acids and alkalies and capable of being boiled in linseed oil.

6. The products obtained by partially hydrogenating aliphatic saturated hydrocarbons substituted by at least three substituents of the formula —R—OH, wherein R stands for an aromatic hydrocarbon radical, said products being of resinous character, soluble in aliphatic alcohols and ketones, insoluble in benzene, benzine, ethers, acids and alkalies and capable of being boiled in linseed oil.

7. The products obtained by partially hydrogenating at temperatures between about 150° C. and about 300° C. aliphatic saturated hydrocarbons containing at least three substituents of the formula —R—OH, wherein R stands for an aromatic hydrocarbon radical, said products being of resinous character, soluble in aliphatic alcohols and ketones, insoluble in benzene, benzine, ethers, acids and alkalies and capable of being boiled in linseed oil.

8. The products obtained by partially hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical, said products being of resinous character, soluble in aliphatic alcohols and ketones, insoluble in benzene, benzine, ethers, acids and alkalies and capable of being boiled in linseed oil.

9. The products obtained by partially hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical, of the benzene series, said products being of resinous character, soluble in aliphatic alcohols and ketones, insoluble in benzene, benzine, ethers, acids and alkalies and capable of being boiled in linseed oil.

10. The products obtained by partially hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical in the presence of an organic solvent, said products being of resinous character, soluble in aliphatic alcohols and ketones, insoluble in benzene, benzine, ethers, acids and alkalies and capable of being boiled in linseed oil.

11. The products obtained by hydrogenating aliphatic saturated hydrocarbons substituted by at least three substituents of the formula —R—OH, wherein R stands for an aromatic hydrocarbon radical, in the presence of a hydrogenation catalyst, said products being of resinous character, soluble in aliphatic alcohols and ketones, insoluble in benzene, benzine, ethers, acids and alkalies and capable of being boiled in linseed oil.

12. The products obtained by hydrogenating at temperatures between about 150° C. and about 300° C. aliphatic saturated hydrocarbons containing at least three substituents of the formula —R—OH, wherein R stands for an aromatic hydrocarbon radical, in the presence of finely divided nickel, said products being of resinous character, soluble in aliphatic alcohols and ketones, insoluble in benzene, benzine, ethers, acids and alkalies and capable of being boiled in linseed oil.

13. The products obtained by hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical in the presence of finely divided nickel, said products being of resinous character, soluble in aliphatic alcohols and ketones, insoluble in benzene, benzine, ethers, acids and alkalies and capable of being boiled in linseed oil.

14. The products obtained by hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical of the benzene series, in the presence of finely divided nickel, said products being of resinous character, soluble in aliphatic alcohols and ketones, insoluble in benzene, benzine, ethers, acids and alkalies and capable of being boiled in linseed oil.

15. The products obtained by hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical in the presence of an organic solvent and in the presence of finely divided nickel, said products being of resinous character, soluble in aliphatic alcohols and ketones, insoluble in benzene, benzine, ethers, acids and alkalies and capable of being boiled in linseed oil.

16. The products obtained by partially hydrogenating aliphatic saturated hydrocarbons substituted by at least three substituents of the formula —R—OH, wherein R stands for an aromatic hydrocarbon radical, in the presence of a hydrogenation catalyst, said products being of resinous character, soluble in aliphatic alcohols and ketones, insoluble in benzene, benzine, ethers, acids and alkalies and capable of being boiled in linseed oil.

17. The products obtained by partially hydrogenating at temperatures between about 150° C. and about 300° C. aliphatic saturated hydrocarbons containing at least three substituents of the formula —R—OH, wherein R stands for an aromatic hydrocarbon radical, in the presence of finely divided nickel, said products being of resinous character, soluble in aliphatic alcohols and ketones, insoluble in benzene, benzine, ethers, acids and alkalies and capable of being boiled in linseed oil.

18. The products obtained by partially hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical, in the presence of finely divided nickel, said products being of resinous character, soluble in aliphatic alcohols and ketones, insoluble in benzene, benzine, ethers, acids and alkalies and capable of being boiled in linseed oil.

19. The products obtained by partially hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical of the benzene series, in the presence of finely divided nickel, said products being of resinous character, soluble in aliphatic alcohols and ketones, insoluble in benzene, benzine, ethers, acids and alkalies and capable of being boiled in linseed oil.

20. The products obtained by partially hydrogenating at temperatures between about 150° C. and about 300° C. and under superatmospheric pressures between about 100 and about 300 atmospheres aliphatic saturated hydrocarbons containing at least three substituents of the formula —R—OH, wherein R stands for an aromatic hydrocarbon radical, in the presence of an organic solvent and in the presence of finely divided nickel, said products being of resinous character, soluble in aliphatic alcohols and ketones, insoluble in benzene, benzine, ethers, acids and alkalies and capable of being boiled in linseed oil.

21. The product obtained by hydrogenating at temperatures between 150° C. and 250° C. and under a pressure of 250 atmospheres triphenylolpropane, dissolved in ethanol, in the presence of nickel precipitated on pumice stone, said product being of resinous character, soluble in aliphatic alcohols and ketones, insoluble in benzene, benzine, ethers, acids and alkalies and capable of being boiled in linseed oil.

22. The product obtained by hydrogenating at temperatures between 160° C. and 200° C. and under a pressure of 180 to 210 atmospheres tricresylolpropane, dissolved in isopropanol, in the presence of nickel precipitated on pumice stone, said product being of resinous character, soluble in aliphatic alcohols and ketones, insoluble in benzene, benzine, ethers, acids and alkalies and capable of being boiled in linseed oil.

23. The product obtained by hydrogenating at temperatures between 160° C. and 200° C. and under a pressure of 180 to 200 atmospheres the triphenylolbutane obtained from phenol and crotonaldehyde and carrying out the hydrogenation in the presence of alcohol and of nickel precipitated on pumice stone until 60 per cent. of the amount of hydrogen theoretically required for completely hydrogenating all double bonds are consumed, said product being of resinous character, soluble in aliphatic alcohols and ketones, insoluble in benzene, benzine, ethers, acids and alkalies and capable of being boiled in linseed oil.

FRITZ BLASS.
PAUL HEISEL.
ALBERT HENDSCHEL.
OTTO NICODEMUS.